United States Patent
Aguera et al.

(10) Patent No.: US 12,280,891 B2
(45) Date of Patent: Apr. 22, 2025

(54) METHOD FOR ASSEMBLING A FUSELAGE PORTION USING WELDING, WITH IMPROVED FLEXIBILITY, AND FUSELAGE PORTION AND AIRCRAFT THUS OBTAINED

(71) Applicant: AIRBUS OPERATIONS (S.A.S.), Toulouse (FR)

(72) Inventors: Damien Aguera, Toulouse (FR); Matthieu De Kergommeaux, Toulouse (FR); Johan Dentesano, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 54 days.

(21) Appl. No.: 18/374,175

(22) Filed: Sep. 28, 2023

(65) Prior Publication Data

US 2024/0109672 A1 Apr. 4, 2024

(30) Foreign Application Priority Data

Sep. 29, 2022 (FR) ..................................... 2209932

(51) Int. Cl.
*B64F 5/10* (2017.01)
*B64C 1/06* (2006.01)

(52) U.S. Cl.
CPC ................ *B64F 5/10* (2017.01); *B64C 1/069* (2013.01)

(58) Field of Classification Search
CPC ........... B29C 66/122; B29L 2031/3082; B64C 1/061; B64C 1/068; B64C 1/0683; B64C 1/0685; B64C 1/069; B64C 1/12; B64C 1/26; B64C 2001/0045; B64C 2001/0054; B64C 2001/0081; B64F 5/00; B64F 5/10; B64F 5/40

USPC ........................................................... 244/131
See application file for complete search history.

(56) References Cited

U.S. PATENT DOCUMENTS

| | | | | |
|---|---|---|---|---|
| 6,328,261 B1 * | 12/2001 | Wollaston | ............ | B23K 20/122 244/119 |
| 6,775,895 B2 * | 8/2004 | Koffi | .......................... | F16B 5/00 29/524.1 |
| 7,857,258 B2 * | 12/2010 | Normand | ................ | B64C 1/069 244/119 |

(Continued)

FOREIGN PATENT DOCUMENTS

| DE | 102008041172 A1 | 3/2010 | | |
|---|---|---|---|---|
| EP | 3549854 A1 * | 10/2019 | ............. | B64C 1/069 |

(Continued)

OTHER PUBLICATIONS

French Search Report for Application No. 2209932 dated Apr. 18, 2023.

*Primary Examiner* — Joshua E Rodden
(74) *Attorney, Agent, or Firm* — KDW Firm PLLC

(57) ABSTRACT

A method for assembling aircraft panels by welding improves the flexibility thereof. Panels are butted together along longitudinal joining lines and fixed to one another via their longitudinal edges by welding without the longitudinal ends of their welded edges being connected to one another. Longitudinal hoops are fixed to partially cover the concave surface of the panels at least partially at the ends. The absence of welding at the ends introduces the desired flexibility. The disclosure also covers the fuselage portions formed by assembling panels according to this method and the aircraft including such portions.

10 Claims, 8 Drawing Sheets

(56) References Cited

U.S. PATENT DOCUMENTS

| | | | | |
|---|---|---|---|---|
| 8,104,158 B2* | 1/2012 | Floyd | ........................ | B64F 5/60 |
| | | | | 29/402.11 |
| 10,035,217 B2* | 7/2018 | Johnson | ............... | B23K 20/124 |
| 10,118,685 B2* | 11/2018 | Elze | ........................ | B64C 1/12 |
| 10,633,116 B2* | 4/2020 | Furfari | ..................... | C21D 7/08 |
| 11,685,504 B2* | 6/2023 | Eilken | ....................... | B64C 1/12 |
| | | | | 244/119 |
| 2009/0134275 A1* | 5/2009 | Hackius | ................. | B23K 26/24 |
| | | | | 244/117 R |
| 2009/0283509 A1 | 11/2009 | Frauen | | |
| 2010/0044514 A1 | 2/2010 | Tacke | | |
| 2010/0320321 A1* | 12/2010 | Sauermann | ......... | B29C 66/5221 |
| | | | | 156/92 |
| 2014/0069987 A1* | 3/2014 | Mialhe | ................ | B23K 20/126 |
| | | | | 228/2.1 |
| 2016/0318594 A1* | 11/2016 | Paul | ........................ | B64C 1/069 |
| 2019/0241245 A1* | 8/2019 | Rack | ........................ | B64C 3/26 |
| 2020/0238439 A1* | 7/2020 | Her | ...................... | B23K 20/122 |
| 2022/0258847 A1* | 8/2022 | Labordus | ............... | B29C 66/131 |

FOREIGN PATENT DOCUMENTS

| | | | | |
|---|---|---|---|---|
| FR | 3148924 A1 * | 11/2024 | ........... | B23K 20/122 |
| WO | WO-9858759 A1 * | 12/1998 | ........... | B23K 20/122 |

* cited by examiner

METHOD FOR ASSEMBLING A FUSELAGE PORTION USING WELDING, WITH IMPROVED FLEXIBILITY, AND FUSELAGE PORTION AND AIRCRAFT THUS OBTAINED

TECHNICAL FIELD

The disclosure herein relates to the field of aircraft fuselage assembly. In particular, it relates to the assembling of fuselage panels to form fuselage portions and, in particular, fuselage sections, and to the assembling of these formed sections. The disclosure herein also relates to the fuselage portion, to the fuselage section and to the aircraft which are thus obtained.

BACKGROUND

As shown in FIGS. 1 and 2, the fuselage 2 of an aircraft 4 comprises several fuselage sections 6, 8 butted together and assembled with one another along circumferential joining lines 5 that define planes perpendicular to the longitudinal axis of the aeroplane. Each section 6, 8 is itself obtained by assembling fuselage panels 10, 12, 14, 16 along longitudinal joining lines 17A and 17B.

As illustrated in FIG. 2, the method of assembling an aircraft fuselage 2 comprises a step of longitudinal joining and the technique of assembling using welding has been developed in order to achieve this. Thus, at least two panels 10, 12 are positioned contiguously and assembled by welding them edge to edge along a joining line 17A for the joining of the panels 10 and 12 in order to form a section 6 (only the two panels 10, 12 of which have been depicted in FIG. 2). The term longitudinal refers to the longitudinal direction X of the aircraft 4. The section 6 thus formed is positioned contiguously with another section 8 and the sections 6 and 8 are assembled with one another in a more conventional way, namely using fixings 19 for example of the rivet type. The welding together of two panels longitudinally from one end to the other deprives the fuselage of any flexibility. Now, on assembly, flexibility in the join is needed in order to make the sections fit together.

SUMMARY

The disclosure herein seeks to offer a method of welded assembly that allows an improvement in the flexibility thereof.

To this end, the disclosure herein relates to a method for assembling aircraft fuselage panels, wherein panels are butted together along longitudinal joining lines and fixed to one another via their longitudinal edges by welding without the longitudinal ends of their welded edges being connected to one another and wherein longitudinal hoops are fixed in such a way as to partially cover the concave surface of the panels at least partially at the ends.

In this way, the assembling method offers the fuselage a certain flexibility once the panels have been fixed to one another.

The disclosure herein provides at least one of the following optional features, considered alone or in combination.

The panels are welded to one another along their entire length L and the longitudinal ends of the welded edges are unwelded.

The welding operation is performed over only part of the edges that are to be connected and not at the ends.

The longitudinal hoops at least partially cover the unwelded ends of the edges and part of the welded edges over a length that allows the fitting of at least one fixing for fixing the hoops to the panels.

The length of the unwelded ends is less than the inter-frame distance.

Once assembled, the panels form a section, and the sections are assembled in pairs using a circumferential hoop which straddles the longitudinal hoops.

Once assembled, the panels form a section, and the sections are assembled in pairs using a circumferential hoop which adjoins the longitudinal hoops to which they are connected using a fishplate.

The disclosure herein also relates to a fuselage portion comprising at least two panels which are connected along longitudinal joining lines by their longitudinal edges which are welded together without the longitudinal ends of their welded edges being connected to one another, longitudinal hoops being fixed in such a way as to partially cover the concave surface of the panels at least partially at the ends.

The disclosure herein provides the following optional feature, considered alone or in combination.

The longitudinal hoops at least partially cover the unwelded ends of the edges and part of the welded edges over a length that allows the fitting of at least one fixing for fixing the hoops to the panels.

The disclosure herein also relates to an aircraft comprising fuselage portions having at least one of the optional features set out hereinabove, considered alone or in combination, wherein each fuselage portion forms a section and wherein the sections are assembled in pairs using a circumferential hoop.

BRIEF DESCRIPTION OF THE DRAWINGS

Further objects, features and advantages will become apparent from the following description of the disclosure herein, which description is given solely by way of nonlimiting example and with reference to the attached drawings in which.

DETAILED DESCRIPTION

Figure 1:
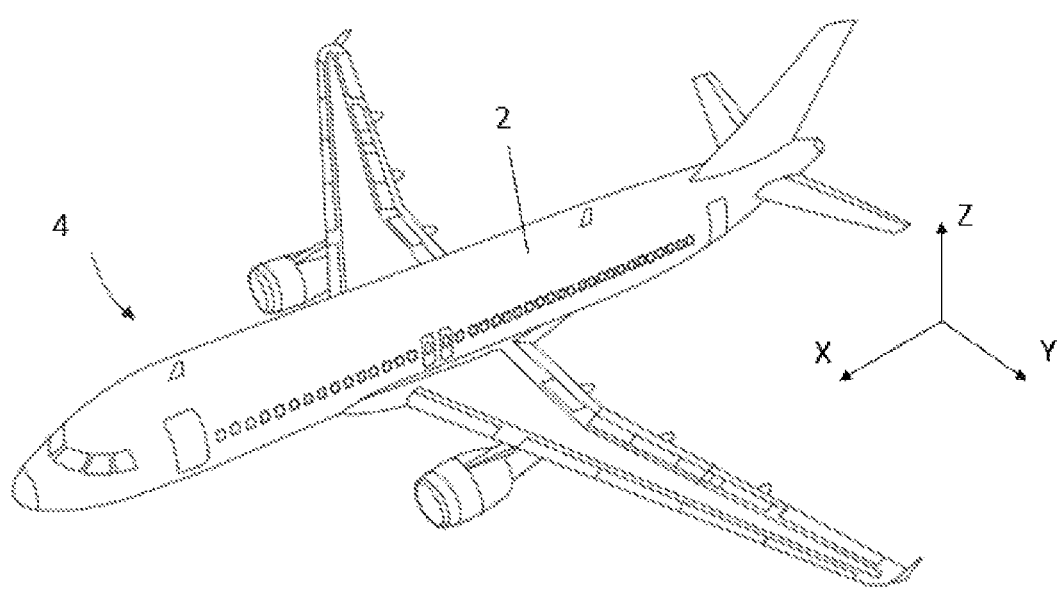
FIG. 1 is a perspective view of an aircraft according to the disclosure herein.
Figure 2:
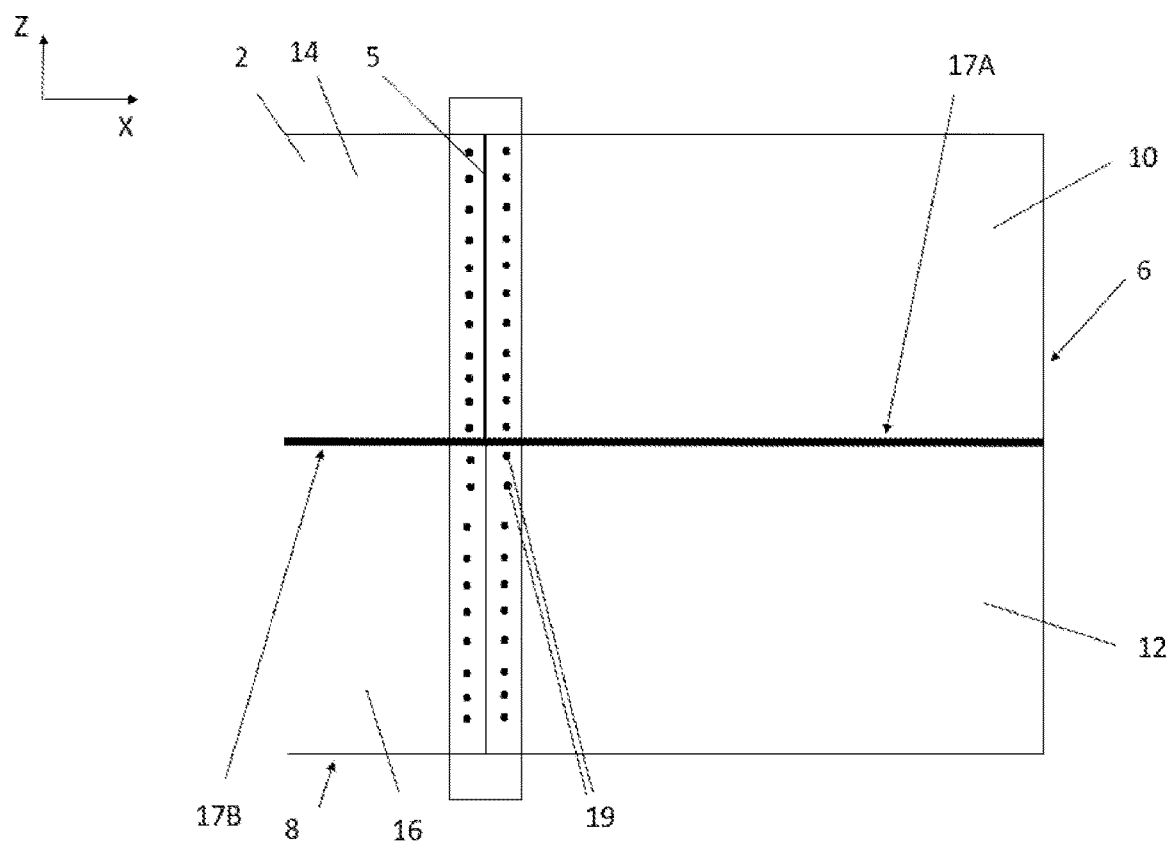
FIG. 2 is a schematic view of the assembly of fuselage panels notably using the welding technique.

The description which follows refers to an orthonormal frame of reference X, Y, Z (visible in FIG. 1) in which the horizontal directions X and Y and the vertical direction Z are defined with reference to an aircraft stationed on horizontal ground. The three directions X, Y, Z are mutually orthogonal. The aircraft fuselage extends in a longitudinal direction X, which is a direction parallel to the roll axis. The direction Y corresponds to the direction oriented transversely and horizontally with respect to the longitudinal direction X, which is a direction parallel to the pitch axis. The direction Z corresponds to the vertical or heightwise direction parallel to the yaw axis. Anything qualified as longitudinal, or respectively transverse or vertical, means parallel to the longitudinal, or respectively transverse or vertical, direction. As far as the fuselage panels are concerned, in the embodiments illustrated the panels are rectangular: the term longitudinal therefore here likewise qualifies the direction of the longest edges of the panel, those intended to lie in the longitudinal direction of the aircraft. However, it is possible to have embodiments in which the shortest edges of the rectangular panels lie in the longitudinal direction or else panels that are not rectangular and that have at least one edge that is at least partially rectilinear and extends in the longitudinal direction. The panel edge that is at least partially rectilinear and lies in the longitudinal direction is the edge that is intended to be joined to an edge of a circumferentially-adjacent panel. The exterior surface of the fuselage faces towards the air outside the aircraft as opposed to the interior surface of the fuselage that faces towards the inside of the fuselage, namely towards the cockpit, the cabin or the like. Since the panels are curved, the interior surface also corresponds to the concave surface of the panel and the exterior surface to the convex surface thereof.

Figure 3:
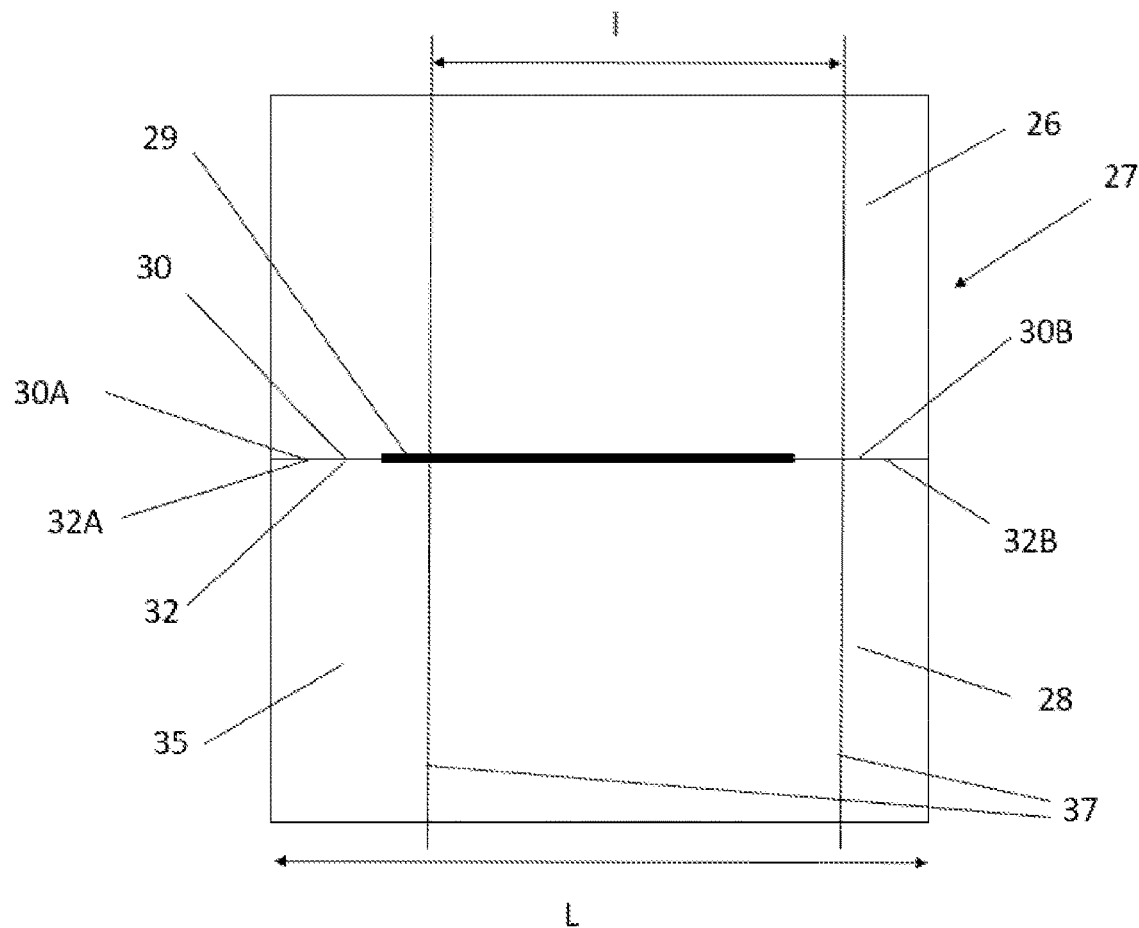
FIG. 3 is a schematic view of two fuselage panels assembled along a longitudinal joining line by welding, the longitudinal ends of the edges of the welded panels not being connected according to the disclosure herein, the stiffening frames that stiffen the panels being depicted in order to indicate the inter-frame distance on the panels of the illustrated section.

As shown in FIG. 3, the method of assembly according to the disclosure herein comprises a first step that consists in assembling with one another, by welding, two panels 26, 28 that are facing one another and longitudinally touching without overlapping one another so as to ensure joining and continuity of the transfer of the flows along the panels. The panels 26, 28 thus assembled form a portion 27 of panels. A fuselage portion 27 corresponds to the assembly of at least two panels 26, 28. The panels are joined along a line 29 referred to as the longitudinal joining line. The assembled panels 26, 28 form a continuous entity with no surface discontinuity. Only the assembly of two panels is described because the assembly along longitudinal joining lines is the same for all of the panels that make up the one same section. The panels 26, 28 are positioned contiguously so that their touching longitudinal edges 30, 32 can be welded without the longitudinal ends 30A, 30B, 32A, 32B of these edges being joined together. The panels 26, 28 are depicted in simplified form. They are curved so that once several panels have been assembled as explained hereinabove, they together form a section the shape of which may vary: this may be a cylindrical shape or a more complicated shape, for example having multiple lobes, or else a shape the cross section of which has a contour that changes in the longitudinal direction such as that of the nose cone or of the tail cone of an aircraft or the like.

According to a first embodiment, the panels are assembled longitudinally by welding along their entire length L. What is meant by length L is the longest dimension of the panel running parallel to the direction X, in the case of the rectangular-shaped panels illustrated. In an additional step, the longitudinal ends 30A, 30B, 32A, 32B of the edges 30, 32 of the panels are unwelded by any type of means and for example by cutting. According to a second embodiment, the welding is not performed longitudinally over the entirety of the length L of the panel: the longitudinal ends 30A, 30B, 32A, 32B of the edges 30, 32 of the panels are not assembled with one another. According to one form of the two embodiments presented, the length of each unwelded end 30A, 30B, 32A, 32B is determined by the need for flexibility of the section during assembly. According to one possible form, the length of each unwelded end does not exceed the inter-frame distance I illustrated in FIG. 3. Remember that a fuselage section comprises a skin 35, for example made of composite material, stiffened by circumferential stiffeners 37 referred to as frames. The inter-frame distance I corresponds to the distance between two frames on the panel concerned or, if there is only one frame on the panel, to the distance between the frame on that panel and the closest frame on a longitudinally-adjacent panel.

Figure 4:
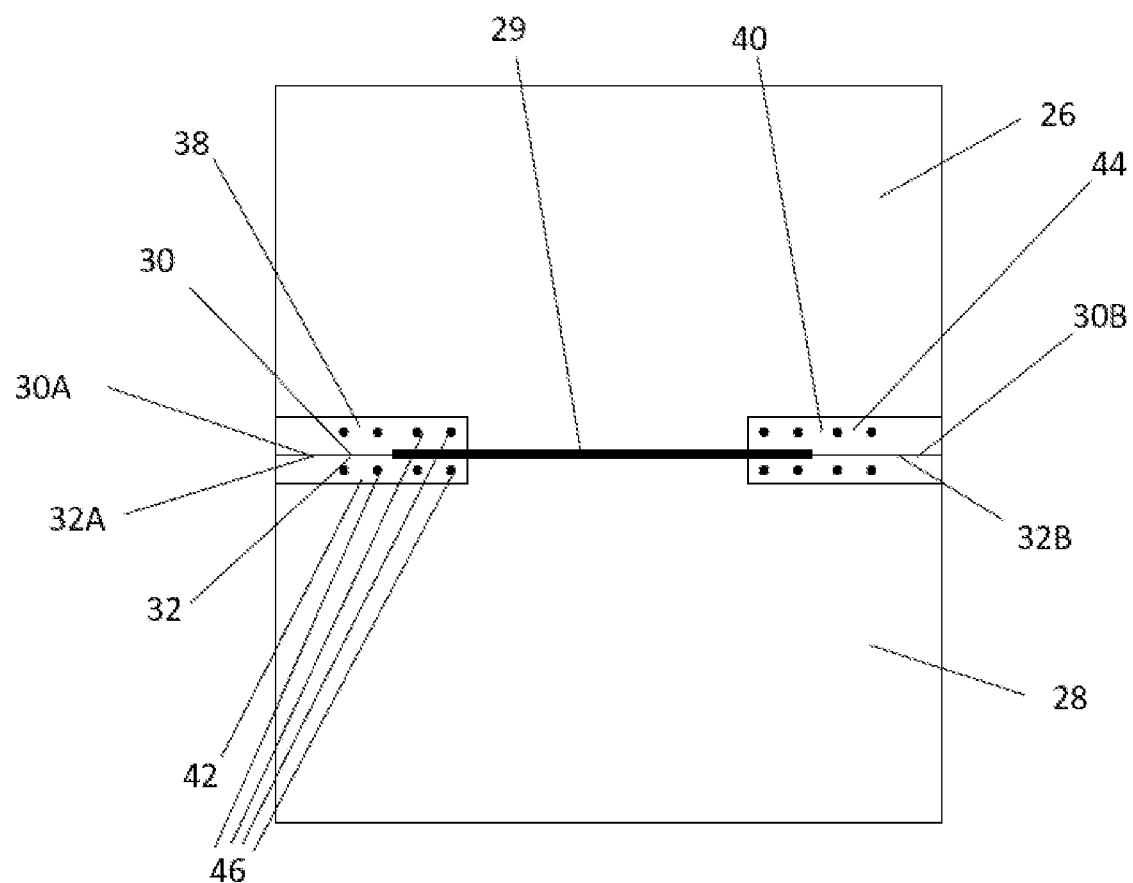
FIG. 4 is the same view as FIG. 3, in which the non-connected ends have been covered by a longitudinal hoop.

The second step of the assembly method, depicted in FIG. 4, consists in placing a longitudinal hoop 38, 40, namely a plate 42, 44, on the interior surface (concave surface) of the fuselage so that it partially covers each of the two panels 26, 28 at the non-joined ends 30A, 30B, 32A, 32B and slightly beyond. The placement of the hoop 38, 40 is performed after the adjacent section 48 has been brought into position (FIG. 5) on the side of the hoop 38 concerned, but could be performed beforehand. The plate 42, 44 is made for example from an aluminum-based alloy, although any other material is possible. Its length is such that the hoop 38, 40 covers the edges 30, 32 of the panels 26, 28 over the entire length of the non-joined ends 30A, 30B, 32A, 32B and extends beyond that in order to allow the fitting of at least one fixing 46 for fixing the plate 42, 44 to the panels 26, 28 in the direction X at the welded edges 30, 32; in the embodiment illustrated, two fixings 46 are provided, one on each side of the longitudinal joining line, making four fixings 46 for the plate 42 only at the welded edges. The fixings 46 may be arranged in at least one row. The fixings 46 are of known type and for example of the rivet type. The width of the hoop is such that it allows the placement of fixings 46 in the direction Y. The thickness of the hoop is the result of design calculations that take account of the material used. Fixings 46 are provided for fixing the hoop 38, 40 to the panels 26, 28 at the welded edges as seen above, but also at part of the ends 30A, 30B, 32A, 32B of the unwelded edges. At least one row of fixings 46 is provided for fixing the plate 42, 44 to the panel 26, and at least one row of fixings facing this row about the longitudinal joining line 29 is provided for fixing the plate 42, 44 to the panel 28. According to the embodiment illustrated, the rows of fixings 46 are parallel to one another and the fixings 46 are positioned equidistantly, although any other positioning is possible. No fixing is provided in the longitudinally endmost zone of the hoop 38, 40 which is the zone closest to the adjacent section 48. The zone devoid of fixings is intended, as will be seen later on, to be covered with a circumferential hoop 50 placed at the circumferential joining line 52.

Figure 5:
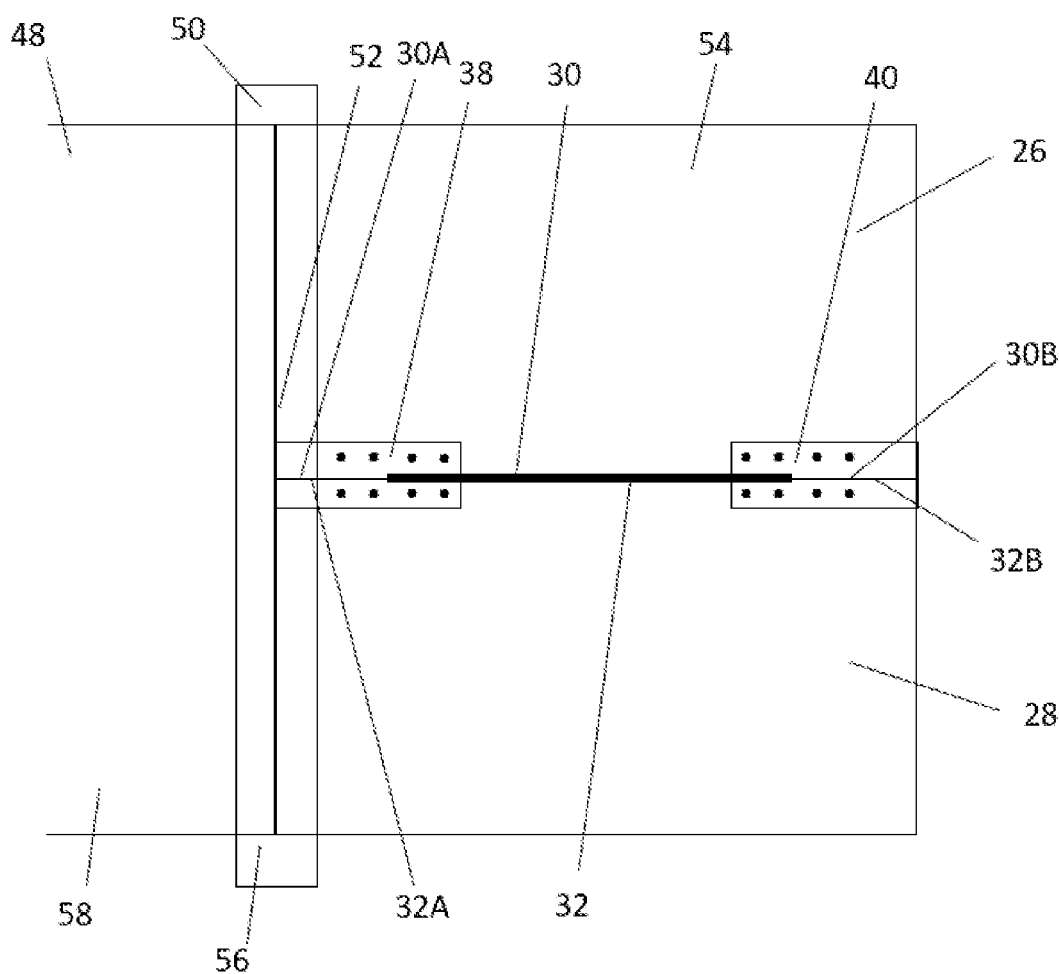
FIG. 5 is the same view as FIG. 4, in which two panels of the one same section are positioned contiguously with the two panels of the section which are depicted in FIG. 4 forming a circumferential joining line covered by a circumferential hoop.

The third step in the method of assembly depicted in FIG. 5 involves assembling the section 54 formed as described previously with an adjacent section, in this instance the section 48. The sections 48, 54 are positioned butting together facing one another so as to be in a continuation of one another. The hoop 50, namely a plate 56, is placed on the interior surface (concave surface) of the fuselage at the circumferential joining line 52 so that it partially covers each of the two panels 26, 28 and the panels 58 of the adjacent section 48. For the sake of simplicity, the individual panels 58 of the section 48 have not been delineated. The circumferential hoop 50 straddles the longitudinal hoop 38 being superposed therewith.

Figure 6:
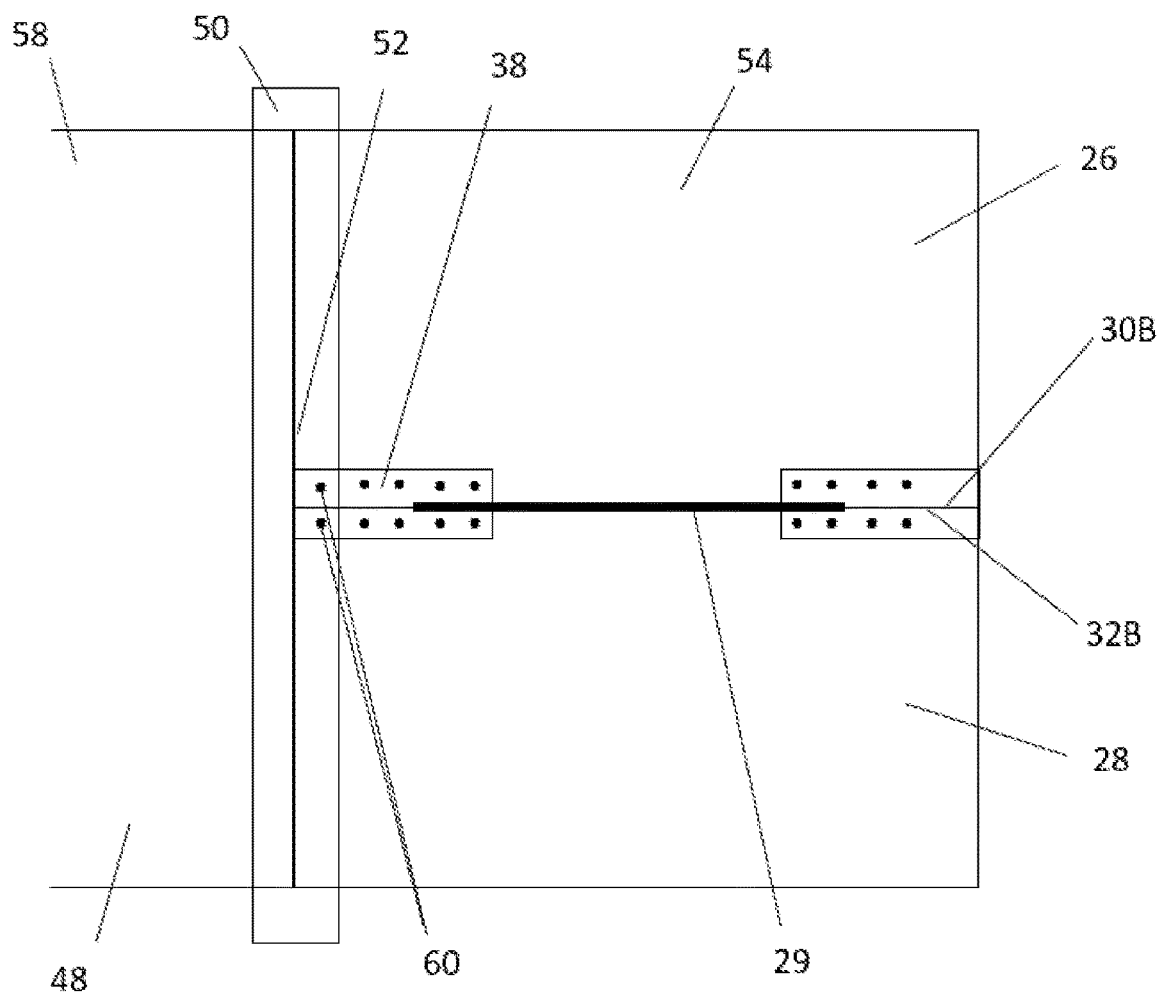
FIG. 6 is the same view as FIG. 5, in which fixings have been fitted on the circumferential hoop, particularly at the level of the longitudinal hoop.

As depicted in FIG. 6, the hoop 50 is assembled with the panels 26, 28, 58 using fixings 60 of known type such as rivets. Fixings 60 are provided at the superposition of the hoops 38, 50.

The disclosure herein also relates to the fuselage portions 27 (FIG. 3) thus formed, to the fuselage section 48, 54 and to the aircraft 4 resulting from assembling such sections.

As depicted in FIG. 3, a fuselage portion 27 comprises at least two panels 26, 28 assembled with one another via their longitudinal edges 30, 32 which are joined together by welding without their longitudinal ends 30A, 30B, 32A, 32B being connected to one another. The panels 26, 28 are positioned facing one another and touching longitudinally without overlapping one another so as to ensure joining and continuity of the transfer of the flows along the panels. The fuselage section corresponds to a fuselage portion 27 of which all the panels 26, 28 have been assembled along longitudinal joining lines 29 to form a cylindrical surface or a surface of more complex curvature such as, for example, one having multiple lobes or else a shape the cross section of which has a contour that changes in the longitudinal direction such as that of the nose cone or of the tail cone of an aircraft (where the panels are then not of rectangular shape) or the like. The assembled panels form a continuous entity with no surface discontinuity either on their interior (concave) surface or on their exterior (convex) surface. In order to form a fuselage section, the panels are of a curved shape such that once a number of panels have been thus assembled, they together form a section. A hoop 38, 40, namely a plate 42, 44, partially covers each of the two panels 26, 28 on their interior (concave) surface at the non-connected ends 30A, 30B, 32A, 32B and beyond: its length is such that the hoop 38, 40 covers the edges 30, 32 of the panels 26, 28 over the entire length of the non-connected ends 30A, 30B, 32A, 32B and extends beyond that to allow the fitting of at least one fixing 46 for fixing the plate 42, 44 to the panels 26, 28 in the direction X at the welded edges 30, 32; in the embodiment illustrated, two fixings 46 are provided one on each side of the longitudinal joining line, making four fixings 46 for the plate at the welded edges only. At least one row of fixings 46 is provided for fixing the plate 42, 44 to the panel 26 and at least one row of fixings facing this row about the longitudinal joining line 29 is provided for fixing the plate 42, 44 to the panel 28. According to the embodiment illustrated, the rows of fixings are parallel to one another, and the fixings are positioned equidistantly but any other positioning is possible. No fixing is provided at the longitudinally endmost zone of the hoop 38, 40 which is the zone closest to the adjacent section 48. The fuselage section is formed of a collection of panels thus assembled.

The aircraft comprises a collection of such sections positioned facing one another butting together so as to be in the continuation of one another. The circumferential hoop 50, namely a plate 56, is placed on the interior surface of the fuselage at each of the circumferential joining lines 52 so that it partially covers the contiguous panels of two adjacent sections. According to one embodiment illustrated in FIG. 6, the circumferential hoop 50 straddles the longitudinal hoops 38 being superposed therewith. The circumferential hoop 50 is assembled with the panels 26, 28, 58 and with the longitudinal hoops using fixings 60 of known type such as rivets. The hoop 50 may be made as a single piece or in several parts.

Figure 7:
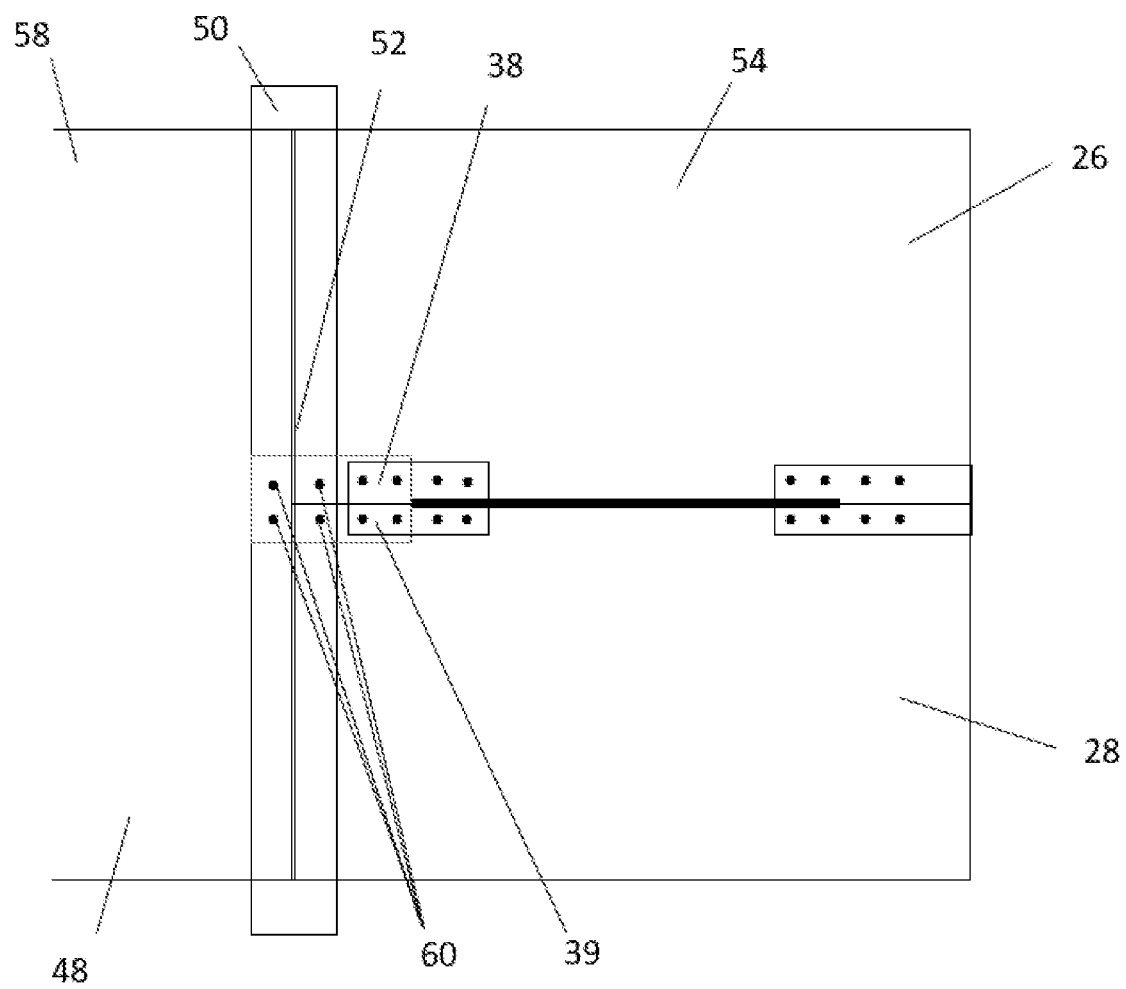
FIG. 7 is the same view as FIG. 5 but depicting a variant in which the hoops are connected using a fishplate.
Figure 8:
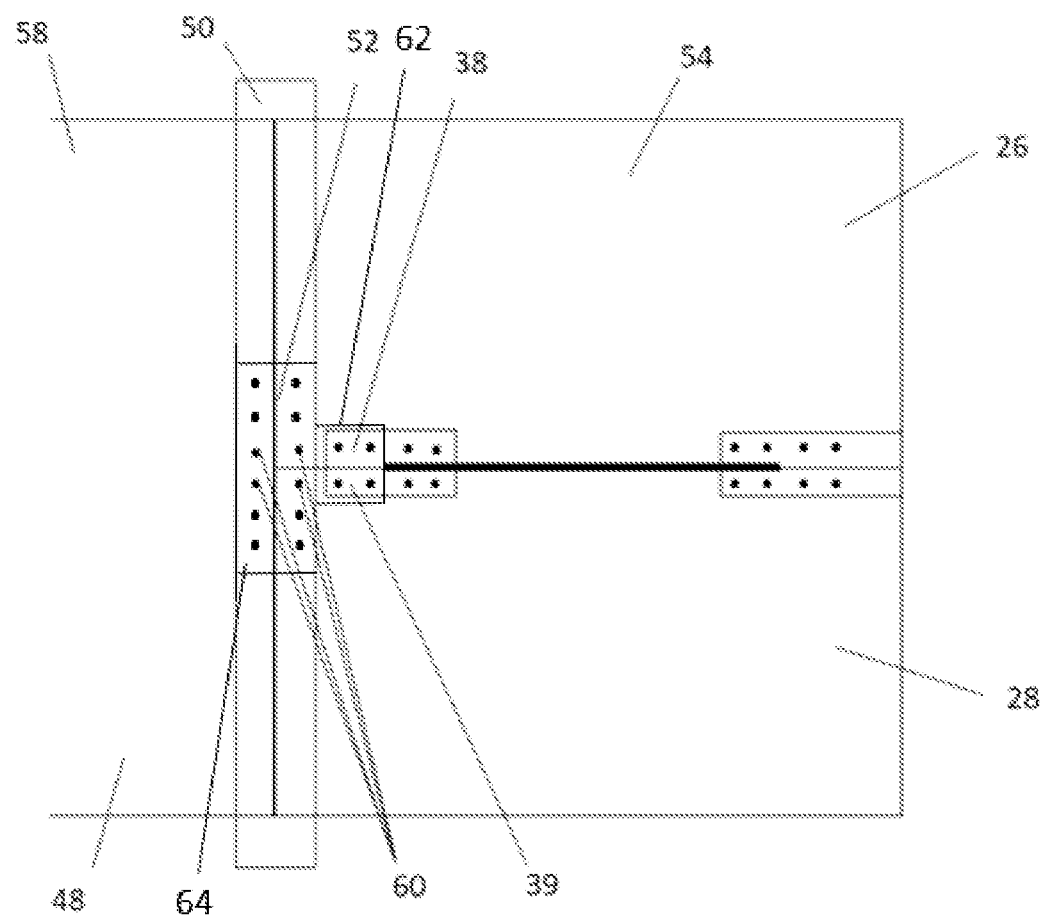
FIG. 8 is the same view as FIG. 7 but with another shape of fishplate.

According to another embodiment illustrated in FIGS. 7 and 8, the circumferential hoop 50 and the longitudinal hoops 38 are joined using at least one fishplate 39.

In the embodiment of FIG. 7, the fishplate 39 is of rectangular shape. It is depicted as having a greater width but may be of the same width as the hoop 38. The fishplate enables the joining-together of the longitudinal hoop and of the circumferential hoop which are adjoining (namely which are contiguous) but which do not overlap. The fishplate 39 may have shapes different from the rectangular shape illustrated.

In the embodiment depicted in FIG. 8, the fishplate 39 has a T shape, having two branches 62, 64 produced in one piece, the branch 62 referred to as longitudinal being the one connected to the centre of the branch 64 that is referred to as being circumferential. The circumferential branch 64 has the same width as that of the circumferential hoop 50. The longitudinal branch 62 has a width at least equal to that of the longitudinal hoop 38.

Regardless as to whether the embodiment is that of FIG. 7 or that of FIG. 8, the circumferential hoop 50 is assembled with the panels 26, 28, 58 and with the intermediate fishplate 39 using fixings 60 of known type such as rivets. The fixings 60 are arranged in at least one circumferential row on each side of the joining line 52, parallel to one another. Likewise, the longitudinal hoop 38 is assembled with the panels 26, 28 and with the intermediate fishplate 39 using fixings 60 of known type such as rivets. The hoop 50 may be formed as a single piece or in several parts. The fixings 60 are arranged in at least one longitudinal row on each side of the longitudinal joining line 29, parallel to one another. The fixings 60 are equidistantly distributed although any other distribution is conceivable.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assembling aircraft fuselage panels, comprising butting together panels along longitudinal joining lines and fixing the panels to one another via longitudinal edges thereof by welding without longitudinal ends of the longitudinal edges being connected to one another and wherein longitudinal hoops are fixed to partially cover a concave surface of the panels at least partially at the longitudinal ends.

2. The method of assembly according to claim 1, wherein the panels are welded to one another along their entire length and wherein the longitudinal ends of the longitudinal edges are unwelded.

3. The method of assembly according to claim 1, wherein the welding is performed over only part of the longitudinal edges to be connected and not at the longitudinal ends.

4. The method of assembly according to claim 1, wherein the longitudinal hoops at least partially cover the longitudinal ends which are unwelded of the longitudinal edges and part of the the longitudinal edges which are welded over a length that allows fitting of at least one fixing for fixing the longitudinal hoops to the panels.

5. The method of assembly according to claim 1, wherein a length of the the longitudinal ends which are unwelded is less than an inter-frame distance.

6. The method of assembly according to claim 1, wherein, once assembled, the panels form a section, and the sections are assembled in pairs using a circumferential hoop which straddles the longitudinal hoops.

7. The method of assembly according to claim 1, wherein, once assembled, the panels form a section, and the sections are assembled in pairs using a circumferential hoop which adjoins the longitudinal hoops to which they are connected using a fishplate.

8. A fuselage portion comprising at least two panels which are connected along longitudinal joining lines by their longitudinal edges which are welded together without longitudinal ends of the longitudinal edges being connected to one another, and wherein longitudinal hoops are fixed to partially cover a concave surface of the panels at least partially at the longitudinal ends.

9. The fuselage portion according to claim 8, wherein the longitudinal hoops at least partially cover the longitudinal ends which are unwelded of the longitudinal edges and part of the the longitudinal edges which are welded over a length that allows the fitting of at least one fixing for fixing the hoops to the panels.

10. An aircraft comprising fuselage portions according to claim 9, wherein each fuselage portion forms a section and wherein the sections are assembled in pairs using a circumferential hoop.

\* \* \* \* \*